(12) United States Patent
Fukushima et al.

(10) Patent No.: US 8,531,454 B2
(45) Date of Patent: Sep. 10, 2013

(54) DISPLAY APPARATUS AND STEREOSCOPIC IMAGE DISPLAY METHOD

(75) Inventors: Rieko Fukushima, Tokyo (JP); Yoshiyuki Kokojima, Yokohama (JP); Sumihiko Yamamoto, Tokyo (JP); Akira Morishita, Tokyo (JP); Yuzo Hirayama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 235 days.

(21) Appl. No.: 12/884,754

(22) Filed: Sep. 17, 2010

(65) Prior Publication Data

US 2011/0242289 A1    Oct. 6, 2011

(30) Foreign Application Priority Data

Mar. 31, 2010    (JP) .................. 2010-084333

(51) Int. Cl.
- G06T 15/50    (2011.01)
- G06T 15/60    (2006.01)
- G06T 15/80    (2011.01)

(52) U.S. Cl.
USPC .................. 345/419; 359/463; 345/32

(58) Field of Classification Search
USPC .......................................................... 345/426
See application file for complete search history.

(56) References Cited

U.S. PATENT DOCUMENTS

| | | | | |
|---|---|---|---|---|
| 5,991,073 A * | 11/1999 | Woodgate et al. | ............ | 359/462 |
| 7,379,060 B2 * | 5/2008 | Kobayashi et al. | ............ | 345/419 |
| 7,652,665 B2 * | 1/2010 | Fukushima et al. | .......... | 345/419 |
| 7,973,791 B2 * | 7/2011 | Mihara | .................. | 345/426 |
| 2005/0105179 A1 * | 5/2005 | Taira et al. | .................... | 359/463 |
| 2008/0180443 A1 * | 7/2008 | Mihara | .......................... | 345/427 |
| 2008/0309663 A1 * | 12/2008 | Fukushima et al. | .......... | 345/419 |
| 2010/0110068 A1 * | 5/2010 | Yamauchi et al. | ............ | 345/419 |

FOREIGN PATENT DOCUMENTS

| | | |
|---|---|---|
| JP | 2006-174434 | 6/2006 |
| JP | 3892808 | 12/2006 |
| JP | 2007-19666 | 1/2007 |
| JP | 3944188 | 4/2007 |

* cited by examiner

*Primary Examiner* — Ulka Chauhan
*Assistant Examiner* — Jin Ge
(74) *Attorney, Agent, or Firm* — Finnegan, Henderson, Farabow, Garrett & Dunner, L.L.P.

(57) ABSTRACT

Certain embodiments provide a display apparatus including: a selection unit configured to make a selection as to which image in images shot by which virtual cameras should be displayed on which subpixel based on the viewing position and the number of parallaxes which can be displayed; a generation unit configured to dispose the virtual camera on the coordinates of the virtual cameras in the CG space, shoot a drawing object in the CG space, and generate an elemental image based on a shot multiple viewpoint image and the selection result in the selection unit; a display unit configured to display a stereoscopic image based on the elemental image; and an optical plate configured to control light rays illuminated from the display unit to make it possible for the viewer to conduct stereoscopic viewing with a light ray interval which is wider than the shooting interval.

4 Claims, 5 Drawing Sheets

DISPLAY APPARATUS AND STEREOSCOPIC IMAGE DISPLAY METHOD

CROSS-REFERENCE TO RELATED APPLICATION

This application is based upon and claims the benefit of priority from prior Japanese Patent Application No. 2010-84333 filed on Mar. 31, 2010 in Japan, the entire contents of which are incorporated herein by reference.

FIELD

Embodiments described herein relate to a display apparatus for displaying a stereoscopic image and its display method.

BACKGROUND

There is a naked eye stereoscopic display which uses the integral photography (IP) technique and which has a parallax barrier using, for example, a pinhole, a slit or a lens array disposed on the display face side of an FPD (Flat Panel Display).

A pixel in the naked eye stereoscopic display includes an exit pupil and a plurality of subpixels on a FPD located behind the exit pupil. Pixel information acquired from a direction coupling the subpixels to the exit pupil is displayed on subpixels. As a result, it becomes possible for the viewer to perceive video information depending on the viewing position and positions of left and right eyes, and the viewer can perceive a solid. A set of pixel information displayed by taking subpixels corresponding to an exit pupil as the unit is called elemental image.

Since the number of pixels on the FPD is finite, the number of subpixels assigned to the exit pupil (which is equal to the number of parallaxes) also becomes finite, and the range of the elemental image which can be displayed is also restricted. Therefore, restrictions are imposed on a range in which a stereoscopic video can be seen and a depth which can be represented (depth representation range).

Therefore, the viewing zone can be widened by detecting a direction of the viewer and changing over a subpixel assigning an elemental image corresponding to the exit pupil to a subpixel viewed through the exit pupil. When changing over subpixels, pixel information displayed there is also changed over according to the illumination direction of the light ray. As a result, light rays required for the viewer to view a stereoscopic video are selected and reproduced.

There is a method for making the viewpoint interval narrower than the interval of light rays viewed from the FPD through the exit pupil when acquiring a multiple viewpoint image. A display object exceeding the depth representation range can also be crushed and displayed in the depth representation range by making the viewpoint interval narrow.

If the viewpoint interval of a multiple viewpoint image is made narrow, then the parallax of the image viewed by both eyes becomes small and a display object exceeding the depth representation range can also be crushed and displayed in the depth representation range. On the other hand, even if the viewing position moves horizontally, the side face cannot be seen readily (the motion parallax is small). In other words, as a result of suppressing the binocular parallax, the sacrifice of the motion parallax becomes great even in the case where the viewing zone is controlled.

DETAILED DESCRIPTION

Certain embodiments provide a display apparatus including: an estimation unit configured to estimate a viewing position of a viewer; a coordinate determination unit configured to determine coordinates of virtual cameras arranged in a CG space with a specific shooting interval according to the viewing position; a selection unit configured to make a selection as to which image in images shot by which the virtual cameras should be displayed on which subpixel based on the viewing position and the number of parallaxes which can be displayed; a generation unit configured to dispose the virtual cameras on the coordinates of the virtual cameras in the CG space, shoot a drawing object in the CG space, and generate an elemental image based on a shot multiple viewpoint image and the selection result in the selection unit; a display unit configured to display a stereoscopic image based on the elemental image; and an optical plate configured to control light rays illuminated from the display unit to make it possible for the viewer to conduct stereoscopic viewing with a light ray interval which is wider than the shooting interval.

Hereafter, a display apparatus and a stereoscopic image display method according to an embodiment will be described more specifically with reference to the drawings. For convenience of description, the size ratios on the drawings differ from those in the actual embodiment in some parts, and the vertical and horizontal directions indicate relative position relations and differ from directions based on the direction of the gravity in some parts.

Figure 1:
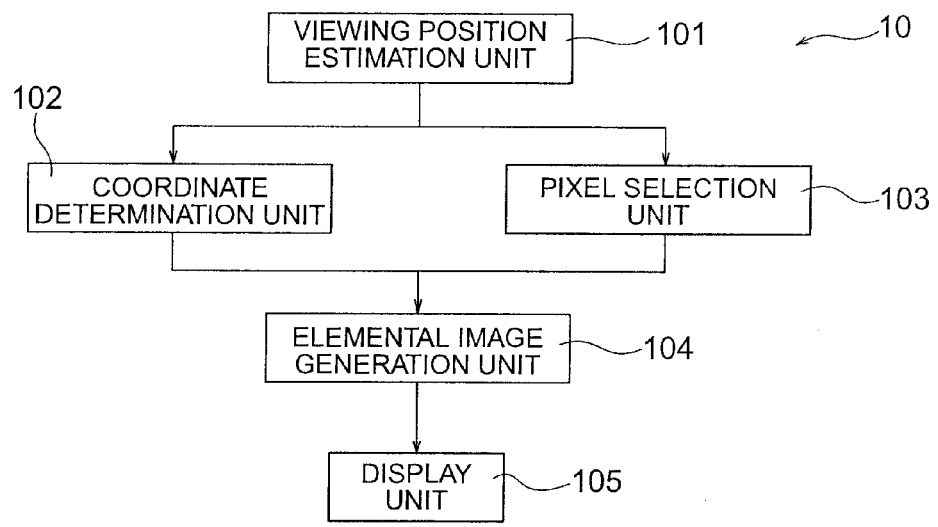
FIG. 1 is a block diagram showing a display apparatus according to an embodiment.

FIG. 1 is a block diagram showing a display apparatus according to the present embodiment. A display apparatus 10 according to the present embodiment includes a viewing position estimation unit 101, a coordinate determination unit 102, a pixel selection unit 103, an elemental image generation unit 104, and a display unit 105.

The viewing position estimation unit 101 is provided to estimate a viewing position of a viewer who views the display apparatus 10. In the viewing position estimation unit 101, for example, an acceleration sensor for measuring an angle of the display apparatus 10 from the gravity direction or a head tracking unit for estimating a direction of a face or a head recognized by using a camera image can be used. Furthermore, a distance sensor for measuring the distance between the viewer and the display unit 105 can be used.

The coordinate determination unit 102 is provided to determine coordinates of a virtual camera disposed in a CG space according to the viewing position estimated in the viewing position estimation unit 101. As for coordinates, the coordinates of the virtual camera disposed in the CG space are determined to provide the motion parallax independently of the viewpoint interval of the multiple viewpoint image. The method for determining coordinates will be described below.

The pixel selection unit 103 is provided to select which subpixel should display pixel information shot by which virtual camera according to the viewing position estimated by the viewing position estimation unit 101 and the number of parallaxes which can be displayed on the display unit 105. In other words, the pixel selection unit 103 is provided to select an elemental image corresponding to which exit pupil should be displayed. A pixel can be selected by determining a viewpoint number corresponding to the exit pupil provided on the display unit 105. The reason why the position of a subpixel is associated with a viewpoint number is that selection of a viewpoint number of a virtual camera corresponds to selection of a subpixel in one-to-one correspondence in the case where the interval of light rays coincides with the viewpoint interval of the multiple viewpoint image.

The elemental image generation unit 104 generates elemental image which becomes the origin of image information displayed on the display unit 105. The elemental image generation unit 104 shoots a display object in the CG space by using a virtual camera disposed on coordinates determined by the coordinate determination unit 102. The elemental image generation unit 104 rearranges a multiple viewpoint image which is shot by taking a pixel as the unit based on pixel selection in the pixel selection unit 103 and thereby generates an elemental image. For convenience of handling image information, it is desirable that the elemental image generation unit 104 generates an elemental image array by connecting a plurality of elemental images corresponding to generated exit pupils. As for the generation method of a concrete elemental image, the elemental image can be generated by using the method described in, for example, Japanese Patent No. 3892808.

The display unit 105 displays the elemental image generated by the elemental image generation unit 104 on the FPD (display means). The image information displayed on the FPD is emitted through an optical plate, and viewed by the viewer as a stereoscopic image.

Figure 2:
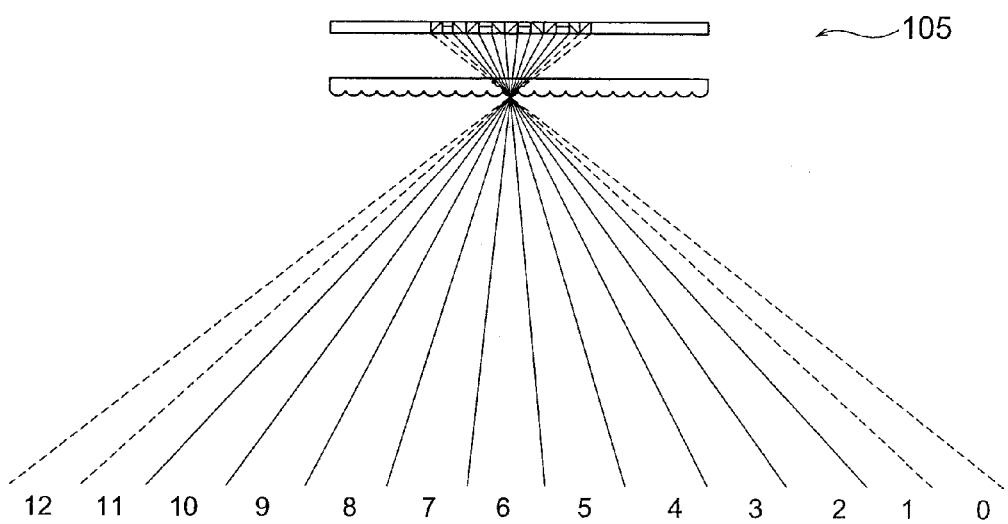
FIG. 2 is a diagram showing a display apparatus according to the embodiment.

FIG. 2 is a diagram showing a display apparatus according to the present embodiment. Relations among the section of the display apparatus, subpixels, illuminated light rays, and viewpoint numbers are schematically shown. Each subpixel has a finite width, and light rays are illuminated with finite widths. In a state represented by the example shown in FIG. 2, viewpoint numbers 2 to 10 which are subpixels provided to be opposed to one exit pupil are determined from among thirteen viewpoints 0 to 12 corresponding to the exit pupil. In the example, a lenticular lens is used as the exit pupil, and light rays illuminated from one lenticular lens are illustrated. In FIG. 2, the pixel width of N subpixels (where N=the number of parallaxes, nine parallaxes in the case of FIG. 2) assigned to a lens is drawn to be larger than the lens pitch, for intelligibility. As a matter of fact, however, the pixel width of N subpixels is designed to be nearly equal to the lens pitch, and N (or (N+1) in some designs) subpixels are provided behind every lens.

Figure 3:
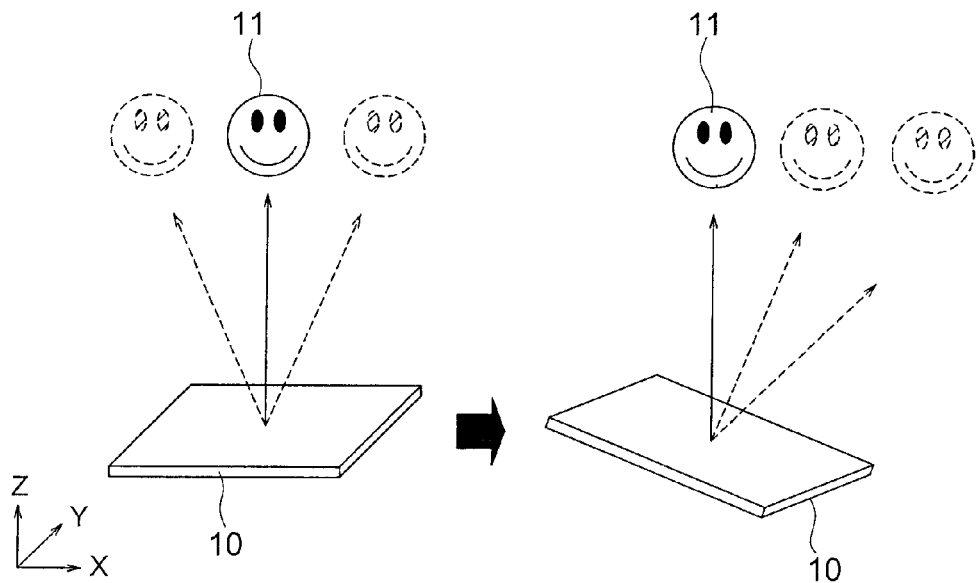
FIG. 3 is a diagram for explaining the function of a viewing position estimation unit.

FIG. 3 is a diagram for explaining the function of the viewing position estimation unit 101. An example using an acceleration sensor in the viewing position estimation unit 101 will now be described. If the angle of the display apparatus 10 is inclined, the position of the viewer 11 based on the display apparatus 10 changes. The viewing position estimation unit 101 indirectly estimates the viewing position of the viewer 11 by detecting the gravity direction of the display apparatus 10 with the acceleration sensor. As for the viewing position of the viewer, there are an XY direction which is a direction parallel to the display face of the display apparatus 10 and a direction (Z direction) of the distance from the display face. The X direction is a direction perpendicular to the extension direction of the lenticular lens.

Figure 4:
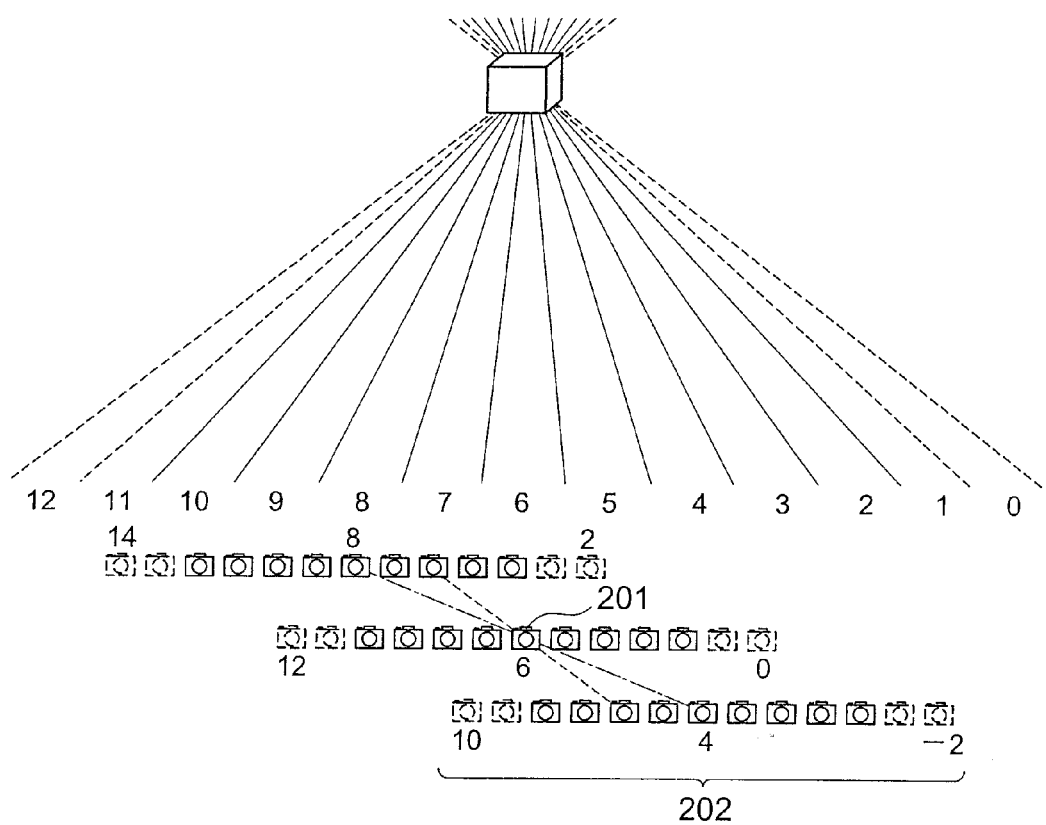
FIG. 4 is a diagram for explaining the function of a coordinate determination unit.

FIG. 4 is a diagram for explaining the function of the coordinate determination unit 102. Coordinates of the multiple viewpoint virtual camera change to the left and right continuously. However, overlapping makes it hard to see. For convenience, therefore, the coordinates are shifted vertically in illustration. The coordinate determination unit 102 determines coordinates of a virtual camera disposed in the CG space. First, the coordinate determination unit 102 determines a center viewpoint 201 in a position in the CG space corresponding to the viewing position in the X direction from among viewing positions estimated in the viewing position estimation unit 101. The center viewpoint 201 is determined in a position on a straight line which is indicated as a dot-dash line. For example, if the viewing position coincides with a viewpoint 6, then a viewpoint number 6 shown in the example in FIG. 2 becomes the center viewpoint (the example shown in FIG. 4). In the same way, if the viewing position coincides with a viewpoint 8, then a viewpoint number 8 shown in the example in FIG. 2 becomes the center viewpoint. If the viewing position is located between viewpoints 6 and 7, then a point between viewpoint numbers 6 and 7 becomes the center viewpoint.

After the center viewpoint 201 is determined, a virtual camera 202 is disposed in a position corresponding to the center viewpoint 201. Here, the interval between the virtual cameras 202 is made shorter than the light ray interval of the display apparatus. In other words, the interval between the virtual cameras 202 is made shorter than the viewpoint interval in the CG space at the time when determining a viewpoint number of a center viewpoint corresponding to the above-described viewing position.

Specifically, denoting a horizontal pitch of subpixels forming pixels disposed in the display unit 105 by ppx, a vertical pitch thereof by ppy, a distance between the display unit 105 and an optical aperture of the optical plate by g, and a distance between the viewer and the optical aperture by L, an acquisition interval (viewpoint interval) of a multiple viewpoint image is set equal to (1/z) times as great as L/g×ppx. Letting an initial coordinate of a virtual camera (which coincides in center with the center viewpoint) be X0 and letting a shift quantity of the center viewpoint 201 be Xs, a coordinate X1 (continuous value) of a virtual camera (center) with due regard to the center viewpoint 201 becomes $$X1 = X0 + Xs \tag{1}$$

In FIG. 4, how the viewing position (center viewpoint) can assume a continuous value is represented by the dot-dash line. On the other hand, the virtual camera having the viewpoint number 6 shown in FIG. 4 coincides with X1 when Xs=0. However, the virtual camera having the viewpoint number 6 shown in FIG. 4 moves reflecting a shift of the coordinate of the center viewpoint 201, a shift of the viewpoint number corresponding to the virtual camera (center) which follows the center viewpoint 201, and the viewpoint interval (L/g× ppx/z).

Specifically, a coordinate X2(6) (continuous value) of the viewpoint number 6 after movement becomes $$\begin{aligned} X2(6) &= X1 - (Xs/(ppx \times L/g)) \times (ppx \times L/g/z) \\ &= X0 + Xs - (Xs/z) \\ &= X0 + Xs(1 - 1/z) \end{aligned} \tag{2}$$

In the same way, a coordinate X2(7) (continuous value) of the viewpoint number 7 after movement becomes $$X2(7) = X1 - (Xs/(ppx \times L/g)) \times (ppx \times L/g/z) + \qquad (3)$$
$$(ppx \times L/g/z)$$
$$= X0 + Xs - (Xs/z) + (ppx \times L/g/z)$$
$$= X0 + Xs(1 - 1/z) + (ppx + L/g/z)$$

In other words, considering a difference in viewpoint number from an initial center viewpoint (A), a coordinate X2(B) of a virtual camera having the viewpoint number B is given by $$X2(B)=X1-(Xs/(ppx \times L/g)) \times (ppx \times L/g/z)+(B-A)(ppx \times L/g/z)$$

The equation means that the coordinate does not move from the initial value when z=1, a necessity of shift occurs when z becomes greater than 1, and the coordinate coincides with the viewing position (center viewpoint) when z is infinitely great (2D display). In other words, if the viewpoint interval of the multiple viewpoint image coincides with the light ray interval, then the coordinate of the virtual camera 202 does not change. If the viewpoint interval is narrower than the light ray interval, then the coordinate of the virtual camera 202 moves with due regard to the shift of the viewing position. If the viewpoint interval is zero, i.e., in the case of the 2D display, then all coordinates of the multiple viewpoint image coincide with the center viewpoint (there is no parallax).

It is indicated from handling in Equations (2) and (3) that the coordinate of the virtual camera 202 can assume a continuous value as represented by a dash line in FIG. 4 and described earlier. The viewing position (center viewpoint) can assume the continuous value as represented by the dot-dash line and described earlier. On the other hand, although subpixels for displaying pixel information acquired from the virtual camera (center) disposed on a coordinate which coincides with the center viewpoint 201 are arranged continuously with finite sizes, the subpixels are partitioned by subpixel boundaries. In the same way, regions borne by light rays also have finite widths and become discontinuous.

For example, when the viewing position moves from a position corresponding to a viewpoint 4 to a position corresponding to a viewpoint 5, an image acquired from the virtual camera (center) is first displayed at the viewpoint 4 and displayed at the viewpoint 5 when a boundary between the viewpoint 4 and the viewpoint 5 is exceeded. However, it becomes possible to dissolve such discontinuity by calculating back the multiple viewpoint virtual camera position to make the center viewpoint image visible from the viewing position according to handling in Equations (2) and (3).

Figure 5:
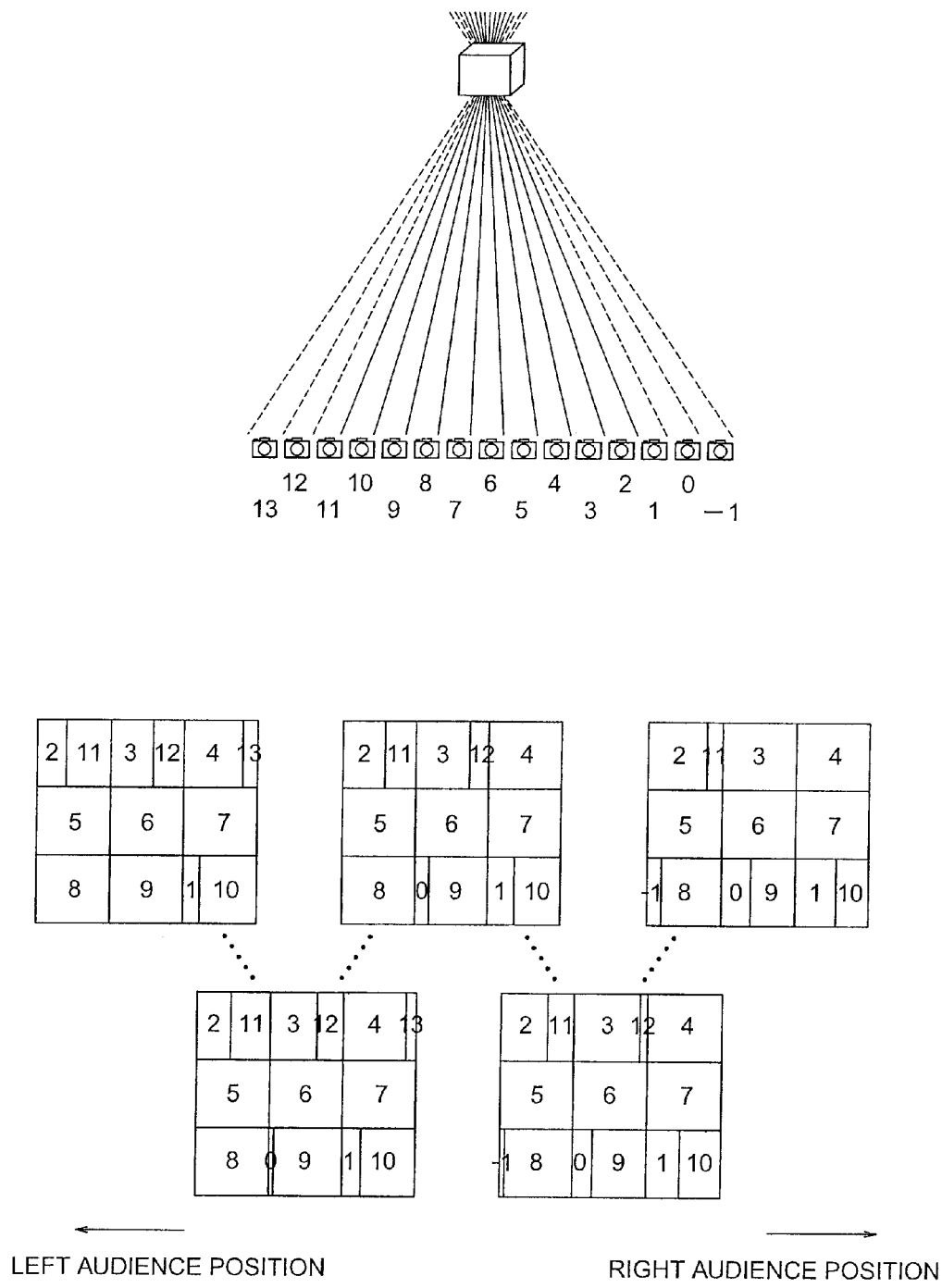
FIG. 5 is a diagram for explaining the function of a pixel selection unit and an elemental image generation unit.

FIG. 5 is a diagram for explaining the function of the pixel selection unit 103. The pixel selection unit 103 makes a selection as to pixel information displayed by a subpixel should be acquired from an image shot by which virtual camera. A lower part of FIG. 5 shows tile images formed by arranging images shot at the same time in a tile form in order to handle images from a plurality of viewpoint numbers in the lump. In the case of nine parallaxes, nine tile images each having a size of ⅓ in both the horizontal and vertical directions are arranged in three rows by three columns. As the position moves to the left side in FIG. 5, selection of viewpoint numbers which form a tile image in the case where the viewing position is moved to a further left side is represented. As the position moves to the right side in FIG. 5, selection of viewpoint numbers which form a tile image in the case where the viewing position is moved to a further right side is represented.

As the viewing position moves to the right side, the ratio of viewpoint numbers −1 to 4 increases. As the viewing position moves to the left side, the ratio of viewpoint numbers 8 to 13 increases. On the other hand, as the viewing position moves to the right side, the ratio of viewpoint numbers 8 to 13 decreases. As the viewing position moves to the left side, the ratio of viewpoint numbers 1 to 4 decreases. Images of viewpoint numbers −1 and 13 are not selected in some cases. This means that subpixels for reproducing light rays proceeding to the viewing position are selected. Details of the selection of the viewpoint number is described in Japanese Patent No. 3892808.

The elemental image generation unit 104 generates an elemental image from a multiple viewpoint image. Specifically, the elemental image generation unit 104 conducts rearrangement on pixel information of a multiple viewpoint image which is shot by taking a subpixel as the unit to form an elemental image corresponding to an exit pupil, based on a selection result in the elemental image generation unit 103.

Figure 6:
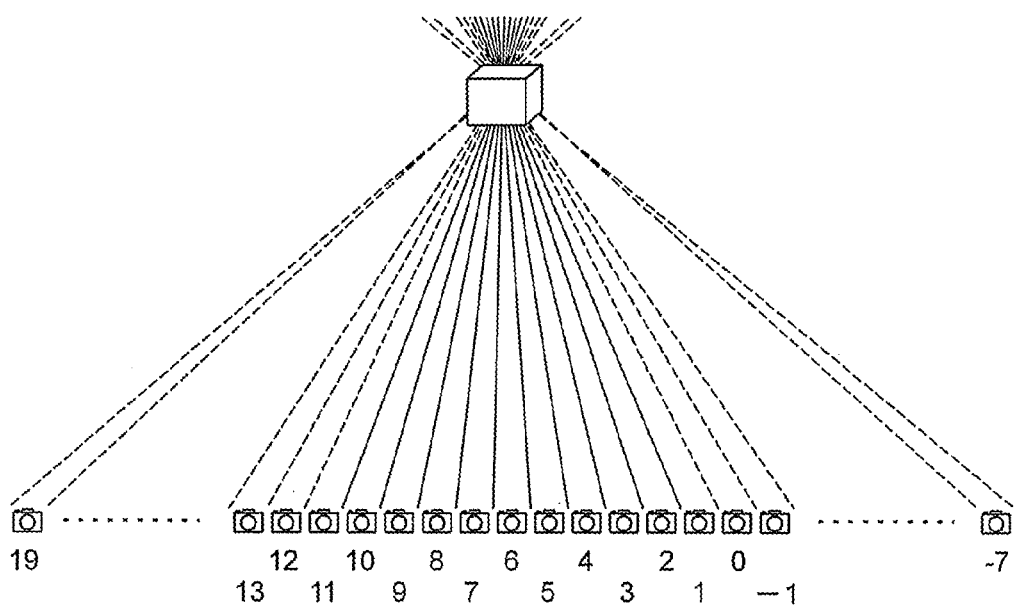
FIG. 6 is a diagram for explaining the function of a pixel selection unit and an elemental image generation unit.

FIG. 6 is a diagram for explaining another example of the function of the pixel selection unit 103. If the distance for viewing the three-dimensional image display apparatus and a point where light rays illuminated from exit pupils converge are made to coincide, changeover the multiple viewpoint images according to the viewing position becomes simple as shown in FIG. 6.

Specifically, in the case of the example shown in FIG. 5, an example of a stereoscopic display method based on the integral photography scheme in which a converging point of light rays is not formed in the viewing position is shown. On the other hand, FIG. 6 shows an example of a stereoscopic display method based on the multiview scheme. In the case of the multiview scheme, illuminated light rays have a converging point of light rays as described earlier. Therefore, boundaries between images supplied from respective viewpoint numbers of the tile image differ from those in the integral photography scheme.

Figure 7:
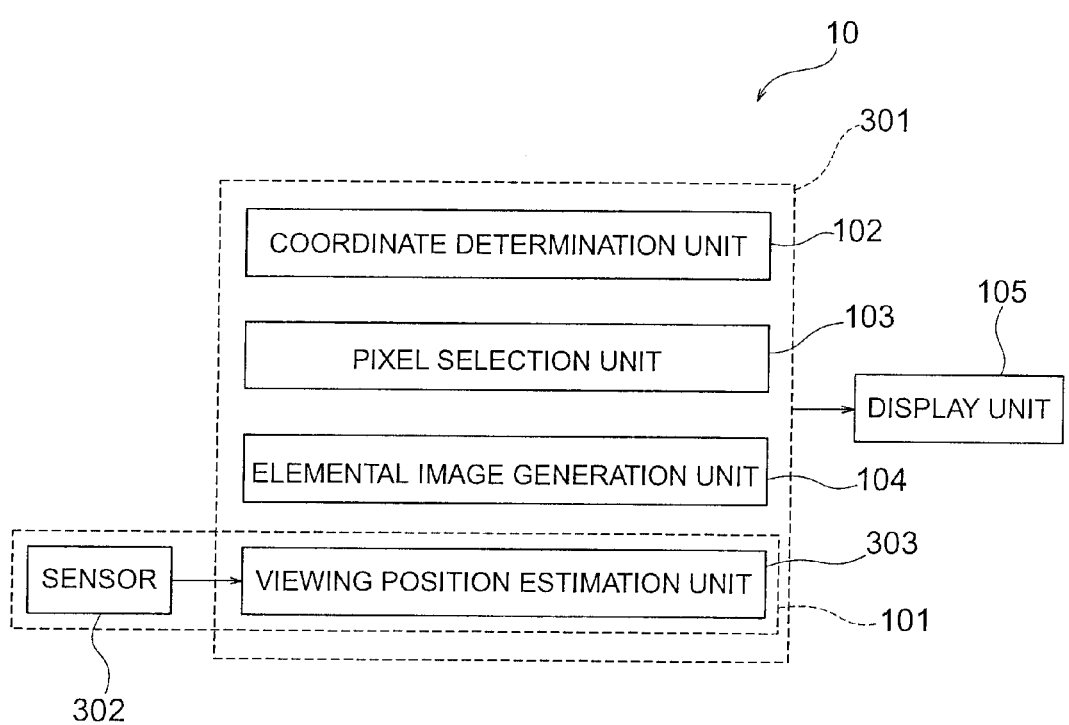
FIG. 7 is a diagram showing a configuration example of a display apparatus according to the embodiment.

FIG. 7 is a diagram showing a configuration example of the display apparatus 10 according to the embodiment. The display apparatus 10 includes a control unit 301, a sensor 302, and the display unit 105. The control unit 301 includes the coordinate position determination unit 102, the pixel selection unit 103, the elemental image generation unit 104, and a viewing position estimation unit 303. The viewing position estimation unit 101 described earlier includes the sensor 302 and the viewing position estimation unit 303.

The control unit 301 includes, for example, a CPU, a main storage, and an external storage. As the sensor 302, the above-described acceleration sensor and head tracking unit can be used. Furthermore, a distance sensor can be used in addition to the acceleration sensor and the head tracking unit. The viewing position estimation unit 303 estimates the viewing position of the viewer who views the display apparatus 10 based on an output of the sensor 302.

A principle of making the distance between the virtual cameras 202 shorter than a distance in the CG space corresponding to a distance from a viewpoint number will now be described.

For displaying a stereoscopic video, a color and luminance information to be seen when an actual solid object is there are displayed on a subpixel which can be viewed from the viewing position beyond the exit pupil. In other words, a light ray emitted in a direction coupling the subpixel to the exit pupil reproduces light and luminance information supplied from the solid object.

Pixel information displayed on N subpixels corresponding to an exit pupil is reproduced in a state in which pixel information of a multiple viewpoint image shot from N directions are rearranged by taking a subpixel as the unit. A set of pixel information shot from N directions correspond to an elemental image. Since the number of pixels on the FPD is finite, the number N of subpixels forming an elemental image, i.e., the number N of light rays also becomes a finite natural number and the viewing zone is also subject to restriction. For displaying a stereoscopic video with low distortion, subpixels and pixel information displayed thereon are determined from the relative positions of the pixel and the exit pupil, i.e., the direction of the light ray.

As the distance between the viewer side (projecting side) and the other side (depth side) becomes greater with a plane having exit pupils arranged serving as a reference place, the display quality of the stereoscopic image is degraded. The number of light rays is limited to N. If display distant from the reference plane is conducted, therefore, parallax between light rays becomes great and it is perceived as a discontinuous change. Specifically in, how side faces are seen (motion parallax) when the viewing position has changed becomes discontinuous, or the stereoscopic video is distorted or multiplexed.

Supposing degradation of the display quality, therefore, a limit is set in a region which can be displayed (viewing zone). Furthermore, the position and direction of the viewer are detected and assignment of N subpixels on the FPD corresponding to the exit pupil is changed to cause a direction of reproduction of N light rays to become the direction of the viewer. In addition, the virtual camera interval is made narrower than the interval of light rays viewed from the FPD through the exit pupil.

If the viewpoint interval of the multiple viewpoint image is made narrow at this time, then the parallax of the image seen in both eyes becomes small and a display object exceeding the depth representation range can also be crushed and displayed in the depth representation range. On the other hand, since the center of the coordinate of the virtual camera nearly coincides with the coordinate in the CG space corresponding to the viewing position, an image having a sufficient motion parallax can be shot.

In the display apparatus 10 having the configuration described heretofore, the sacrifice of the motion parallax can be suppressed even in the case where the viewpoint interval is made narrow. In more detail, in the case where the viewer inclines the viewing position greatly with respect to the display apparatus 10, a motion parallax which runs around the side face of a drawing object can be displayed.

The representation ranges of the display unit 105 in the projection direction and the depth direction are limited by a resolution which can be represented. Even in the case where the sacrifice of the motion parallax is suppressed, however, the shooting interval can be made narrow when representing a drawing object which exceeds in size the representation range.

Those skilled in the art can make various changes and modifications on the embodiment described heretofore within the scope of thought of the invention. These changes and modifications also belong to the scope of the present invention. For example, as for a specific example of the arrangement of virtual cameras, an example in which the virtual cameras are arranged in the horizontal direction of the display apparatus 10 has been shown. However, the virtual cameras may be arranged in the vertical direction or a two-dimensional arrangement of the horizontal direction and the vertical direction may be used. Furthermore, the optical plate of the display unit 105 may have a one-dimensional arrangement in a parallax giving direction such as the horizontal direction or the vertical direction, or may have a two-dimensional arrangement of the horizontal direction and the vertical direction.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display apparatus comprising:
a display unit including pixels arranged in a matrix form in a display region;
an optical plate opposed to the display unit and including exit pupils arranged in a first direction with a specific pitch, the optical plate controlling light rays entered in each of the exit pupils from the display unit to emit in different directions, the display apparatus generating a stereoscopic image by displaying an elemental image that multiple viewpoint image corresponding to viewpoints are rearranged in a region defined by the specific pitch in the display region;
an estimation unit configured to estimate a viewing position of a viewer; and
a coordinate determination unit configured to determine coordinates of virtual cameras each having a different viewpoint in a CG space, the coordinate determination unit configured to determine a center position of the coordinates of virtual cameras in the CG space by projecting the viewing position to the CG space, to project a first light ray emitted from the optical plate to the CG space based on the specific pitch and an emitting direction of the first light ray, and to make intervals between the virtual cameras shorter than an interval along the first direction of a part of the first light ray, the part of the first light ray having a viewpoint image on the same view point and being observed at the center position;
a selection unit configured to make a selection as to which image in images shot by which the virtual cameras should be displayed on which pixels in the display region; and
a generation unit configured to dispose the virtual cameras on the coordinates of the virtual cameras in the CG space, shoot a drawing object in the CG space, and generate an elemental image to rearrange multiple viewpoint image of the drawing object based on the selection result in the selection unit.

2. The apparatus according to claim 1, wherein denoting a horizontal pitch of subpixels forming pixels disposed in the display unit by ppx, a vertical pitch thereof by ppy, a distance between the display unit and an optical aperture of the optical plate by g, and a distance between the viewer and the optical aperture by L, the interval between the virtual cameras is shorter than L/g×ppx or L/g×ppy.

3. The apparatus according to claim 2, wherein the coordinates of the virtual cameras are selected to cause an image from a central viewpoint in a multiple viewpoint image supplied from a virtual camera which is included in the virtual cameras and which is disposed in the center position to be visible from the viewing position.

4. The apparatus according to claim 3, wherein the display unit displays a stereoscopic image depending on the viewing position.

\* \* \* \* \*